(12) United States Patent
Saliba et al.

(10) Patent No.: US 8,213,107 B2
(45) Date of Patent: Jul. 3, 2012

(54) METHODS, SYSTEMS AND APPARATUS FOR REDUCING THE EFFECTS OF TAPE DIMENSIONAL STABILITY

(75) Inventors: George Saliba, Boulder, CO (US); Theron White, Boulder, CO (US); Amir Djalai, Niwot, CO (US)

(73) Assignee: Quantum Corporation, San Jose, CA (US)

( * ) Notice: Subject to any disclaimer, the term of this patent is extended or adjusted under 35 U.S.C. 154(b) by 46 days.

(21) Appl. No.: 12/813,656

(22) Filed: Jun. 11, 2010

(65) Prior Publication Data
US 2010/0309583 A1 Dec. 9, 2010

Related U.S. Application Data

(63) Continuation of application No. 12/036,705, filed on Feb. 25, 2008, now Pat. No. 7,738,212.

(51) Int. Cl.
*G11B 5/584* (2006.01)
*G11B 27/36* (2006.01)

(52) U.S. Cl. ...................... 360/77.12; 360/31

(58) Field of Classification Search .................. None
See application file for complete search history.

(56) References Cited

U.S. PATENT DOCUMENTS

| 5,343,341 A | 8/1994 | Jahren |
| 7,116,514 B2 | 10/2006 | Mahnad et al. |
| 7,738,212 B2 * | 6/2010 | Saliba et al. ............... 360/77.12 |

* cited by examiner

*Primary Examiner* — Andrew L Sniezek
(74) *Attorney, Agent, or Firm* — Baker Botts L.L.P.

(57) ABSTRACT

A method, system, apparatus, and computer readable medium storing instructions for recording data tracks and a method and system for reading data tracks. For recording data tracks, virtual boundary of a first data track recorded on the storage medium is determined. The recording element is positioned based on the determined virtual boundary of the first track and a second data track is recorded by the positioned recording element. For reading data tracks, a first virtual boundary of a first data track and a second virtual boundary of the first data track are determined and a reading element is positioned at a center of the first data track based on the determined virtual boundaries. In the system of reading recorded data tracks, a number of forward reading elements and backward reading elements are provided. The forward reading elements have different pitches.

6 Claims, 16 Drawing Sheets

80%RH

10%RH

10%RH

10%RH

METHODS, SYSTEMS AND APPARATUS FOR REDUCING THE EFFECTS OF TAPE DIMENSIONAL STABILITY

RELATED APPLICATIONS

This application is a continuation of U.S. patent application Ser. No. 12/036,705, entitled "Methods, Systems and Apparatus for Reducing the Effects of Tape Dimensional Stability," which was filed on Feb. 25, 2008, now U.S. Pat. No. 7,738,212. U.S. patent application Ser. No. 12/036,705 is hereby incorporated by reference.

BACKGROUND

1. Field of the Invention

Systems, methods, and apparatus consistent with the present invention relate to magnetic tape storage. More particularly, the systems, methods and devices described here concern ensuring that the width of variable width data tracks is wider than a predetermined width when writing to a tape under extreme operating conditions. The also concern manufacturing tolerances and determining the center of such variable width data tracks in order to locate the read elements so the variable width tracks can be read.

2. Description of the Related Art

Digital tape-recording remains a viable solution for storage of large amounts of data. Digital information is recorded onto a storage medium such as a magnetic recording tape for a wide variety of purposes. For example, magnetic tape storage is assuming larger roles in data archiving, where reliable ultra high capacity storage at low cost is desired. Accurate recording of data onto the storage medium, storage density (storage capacity) of the medium, and accuracy of retrieving stored data are important considerations in recording data onto the medium.

In conventional tape drive technologies, such as LTO (Linear Tape Open), stable substrates, such as PEN (polyethylene naphthalate) and the like, are selected to minimize tape dimensional stability errors. Special servo tracks are used to position the write elements of the heads during writing, and the read elements of the heads during reading, so that the tape drive writes data tracks within specific boundaries and therefore the written data can be recovered at a later time. The servo track is pre-written during the tape manufacturing process. However, a drawback to using pre-written servo tracks is that the servo writing process introduces additional position errors. Additionally, utilizing servo tracks only allows the tape drive to observe position errors that are detected by the servo elements of the tape drive, whereas position errors experienced by a read or write head element of the tape drive during normal operation remain undetected. Accordingly, it is desirable to have a system and a method that can provide position accuracy as observed by the active data heads during writing or reading of data on the medium without having to rely on secondary transducers that detect dedicated servo tracks positioned between the data tracks.

To increase the storage capacity of a medium suitable for data archiving, more data tracks need to be recorded on the medium, with each track becoming increasingly narrower in width. Because of the narrower track widths, the tape becomes more susceptible to various head element position errors with respect to the tape, which occur on conventional tape drives. Lateral tape motion, for example, is one contributing factor to head position errors. Lateral tape motion may be caused by many factors including tape slitting variations, tension variations, imperfections in the guiding mechanism, and environmental factors. Environmental factors, such as heat and humidity, cause significant position errors during the reading and writing of data on the tape. Additionally, mechanical structure stability and manufacturing tolerance accuracy are the source of many other position errors that coalesce to limit tape capacity.

Generally, data track position miss-registration errors due to dimensional stability of the tape has been accepted as a limiting factor in achieving higher track densities and thus achieving higher data capacity per tape. Conventional tape drive technologies compensate for dimensional stability by writing the data tracks much wider than necessary, so that despite errors when writing the data tracks, the data tracks are still sufficiently wide to be accurately read. Another method to counter dimensional stability is to use even more stable tape technology such as PA (polyamid). However, this type of stable tape technology is also significantly more expensive than PEN and the like. Yet another method to counter dimensional stability errors, is to reduce the distance between head channels. However, this method increases the complexity and cost of the head. Accordingly, instead of reducing the distance between head channels, it is desirable to reliably decrease the track width of data tracks stored on a tape while using conventional tape technology. It is also desirable to increase the storage density of conventional tape such as DLT (Digital Linear Tape) or SDLT (Super Digital Linear Tape), using conventional inexpensive tape technology.

One way to improve the storage capacity of conventional tape drives that use conventional tape, is disclosed in U.S. Pat. No. 7,116,514, which is incorporated herein by reference in its entirety. This patent describes a head geometry technique and a system to overwrite a portion of a previous written track when writing a current track. This is possible in a conventional tape drive because tracks are written sequentially. Overwriting a portion of the previous track, or trimming that previous track, while ensuring that the trimmed, or residual, track maintains a sufficient width so that the residual track is still readable, can increase storage density and allow more data tracks to be written on the tape. Writing tracks in this manner can eliminate the dedicated servo tracks. In order to compensate for dimensional stability errors, so that the current track does not inadvertently trim so much of the previous track that the residual track is no longer readable, the previously written track is used as a reference track. An active read element that can function as a servo element is positioned on the previously written track, either at the edge or center of the track, and is able to read and servo by reading the previous track either continuously or at a set interval. As long as the read element can read the data of the residual track, the amount the current track trims the previous track is acceptable. In other words, as long as the read element can read the residual track, the width of the residual track is acceptable. However, specialized heads and tape drives are required to record data in this way. A method of detecting and/or calculating the lateral tape motion using conventional heads and with a higher degree of accuracy is still needed.

As the widths of the written tracks are made narrower, thereby increasing the data density of the medium, the write and read positional accuracy of data on the medium becomes critical. For example, even slight variations in the location of a written track due to dimensional stability errors become noticeable since the margin for error decreases proportionally with the width of the tracks. Environmental factors, such as humidity and temperature, can affect the physical dimensions of the tape and cause variations in the width of the written tracks. This problem is especially prevalent in multi channel/head tape drive systems.

Most modern tape drives have multiple heads for simultaneously writing multiple tracks on a tape. Each head contains at least one write element for writing track data, and at least one read element for reading track data. A write element writes data as a physical track. A group of adjacent physical tracks written by a specific write element is referred to as a physical band. The physical tracks written simultaneously by each of the write elements together constitute a logical track. A band is a group of physical bands, where each physical band corresponds to a unique write element of the tape drive. Some tape drives have two write elements and two read elements per head. The first write/read element pair is used for writing and reading when the tape is moving in a forward direction. A second write/read element pair is used for writing and reading when the tape is moving in a backward direction.

In such multi-head tape drive systems, it becomes important to consider manufacturing tolerances of the heads in addition to dimensional stability and environmental factors. Examples of such manufacturing tolerances include nonconformity in the width of each write element of a head, causing tracks written by different heads to have different widths. Additionally, the pitch, or distance between the write elements of adjacent heads can vary, causing the pitch, or distance between tracks written by the adjacent heads to vary. Similar manufacturing tolerances can affect the read elements as well. For example, since the tracks need not be much wider than necessary to read the tracks, if a read element of a first head is aligned to read a track, another read element of a second head may not be able to read its respective track due to alignment errors because of manufacturing tolerances in the pitch between the read elements of adjacent heads. The tape drive industry has been unable to solve this problem, and the industry has accepted it as an uncorrectable problem. For example, SDLT 220/320/600/SDLT 1 and LTO 1-4 all share the same basic servo off-track statistical error budget design. For these drives, the combination of wide written data tracks and narrow readers are required, as well as a very challenging head/drive design. Furthermore, these drives are limited in total cartridge capacity.

With the advances in track density for the next generation DLT, SDLT and LTO5 drives, errors due to the dimensional stability of tapes are currently believed in the industry to be uncorrectable as evident by the slow rate of improvements of tape track density. Dimensional stability is becoming a greater contributor to the position error budget even as tape servo systems have improved significantly. Various proposals to reduce the dimensional stability errors in the next generation super tape drives have been proposed for a number of years such as a much lower head core pitch, and, as discussed above, using a new tape material such as PA. Unfortunately, these proposals have not been implemented to date due to the significant increase of drive and cartridge cost over current technologies and the requirement for very tight drive manufacturing limits. Hence, there continues to be a need for a technique to correct dimensional stability errors using currently available, inexpensive tape and tape drive technology.

Additionally, the cost and capacity of modern tape drives has lagged behind disks even for archival data storage. Accordingly, there exists a need for a method of writing data to a tape to offer the higher capacity desired by customers from modern tape drives.

SUMMARY

Embodiments of systems, methods and apparatuses are described here that accurately measure and correct the effects of tape dimensional stability caused, for example, by temperature, humidity, tension or creep in a multi-channel tape drive. These techniques are employed in a high accuracy virtual tape servo (VTS) method to precisely determine virtual track edges and derive an optimum next track position that preserves a desired virtual track width. Applying these techniques can correct the effects of dimensional stability errors inherent in multi-channel tape drives. Another aspect of certain embodiments described here is to provide a simple way of writing data such that the data can be read with other tape drives.

Illustrative, non-limiting embodiments of the present invention may overcome the disadvantages described above as well as other disadvantages. Embodiments of the present invention are not necessarily required to overcome any of the disadvantages described above, and the illustrative, non-limiting embodiments of the present invention may not overcome any of the problems described above. The appended claims should be consulted to ascertain the true scope of the invention.

Accordingly to an exemplary, non-limiting formulation of the present invention a method is provided for recording data tracks on a storage medium. The method includes determining a virtual boundary of a first data track recorded on the storage medium, positioning a recording element based on the determined virtual boundary of the first track, and recording a second data track on the storage medium by the positioned recording element.

According to another exemplary, non-limiting formulation of the present invention, a head positioning system is provided. The system includes one or more heads, each of which has one or more read elements and one or more recording elements, and a controller which determines a virtual boundary of the edge of a first data track recorded on the storage medium, controls to position a recording element based on the determined virtual boundary of the first track; and controls the recording element to record a second data track on the storage medium by the positioned recording element.

According to another exemplary, non-limiting formulation of the present invention, a computer readable medium is provided for storing instructions for causing a computer to control the recoding of data tracks. The instructions include determining a virtual boundary of a first data track recorded on the storage medium, causing a recording element to be positioned at a predetermined position based on the determined virtual boundary of the first track, and causing the positioned recording element to record at the predetermined position a second data track on the storage medium.

According to another exemplary, non-limiting formulation of the present invention, a method for reading data tracks stored on a storage medium is provided. The method includes determining a first virtual boundary of a first data track recorded on the storage medium, determining a second virtual boundary of the first data track recorded on the storage medium, and positioning a reading element at a center of the first data track based on the determined virtual boundaries.

According to yet another exemplary, non-limiting formulation of the present invention, a system for reading data tracks stored on a storage medium is provided. The system includes a number of forward reading elements and a number of backward reading elements. The forward reading elements have different pitches.

BRIEF DESCRIPTION OF THE DRAWINGS

The accompanying drawings, which are incorporated in and constitute a part of this specification exemplify certain embodiments of the present invention and, together with the description, serve to explain and illustrate principles of the inventive techniques. In these drawings, like reference numerals refer to like elements.

DETAILED DESCRIPTION

The techniques described here accurately measure and correct for the effects of tape dimensional stability caused, for example, by temperature, humidity, tension or creep in a multi-channel tape drive. These techniques combine a high accuracy virtual tape servo (VTS) method to precisely determine virtual track edges with deriving an optimum next track position that preserves a desired virtual track width that ensures that the track can be read. Applying these techniques can correct the effects of dimensional stability errors inherent to multi-channel tape drives.

One benefit of certain embodiments of the invention is to increase the capacity of tape drives. Another benefit is to enable the use of currently available tape technologies such as PET (polyethylene terephthalate) or PEN instead of requiring the use of more stable and expensive tape technologies such as PA. Another benefit of certain embodiments of the invention is to relax the head and drive manufacturing limits as currently required for super tape drives. Furthermore, the techniques described here for certain embodiments are compatible with virtually all servo technologies presently available. These embodiments also provide significant cost and accuracy enhancements without the need to modify tape drive hardware. Certain embodiments of the invention also can significantly reduce the super drive (SDLT and LTO5) "off-track error budget" enabling the possible use of PEN media for future SDLT as well as being an enabler to the next generation LTO5 magnetic servo.

Virtual Tape Servo (VTS)

An exemplary, non-limiting embodiment of the present invention relates to a technique, referred to as a "Virtual Tape Servo" (VTS), for providing improved tolerance of manufacturing accuracy when writing data, improved consistency when retrieving data, and improved interoperability between various tape devices. VTS utilizes a standard reading process to determine the boundaries of a virtual track by reading and monitoring written data and comparing the ratio of accurately read data to detected errors as a head is moved laterally across data tracks. By comparing the detected values to a predetermined value, virtual track boundaries can be determined.

In an exemplary, non-limiting embodiment of the present invention writing and reading data onto a medium is improved by using VTS technology in which the placement of a virtual track is determined, as explained in greater detail below with reference to FIGS. 1A-1D. By controlling the placement of a virtual track, the virtual tape drive accounts for environmental factors that affect the dimensional stability of the medium when writing data onto the medium. This improves the reading consistency.

Figure 1A:
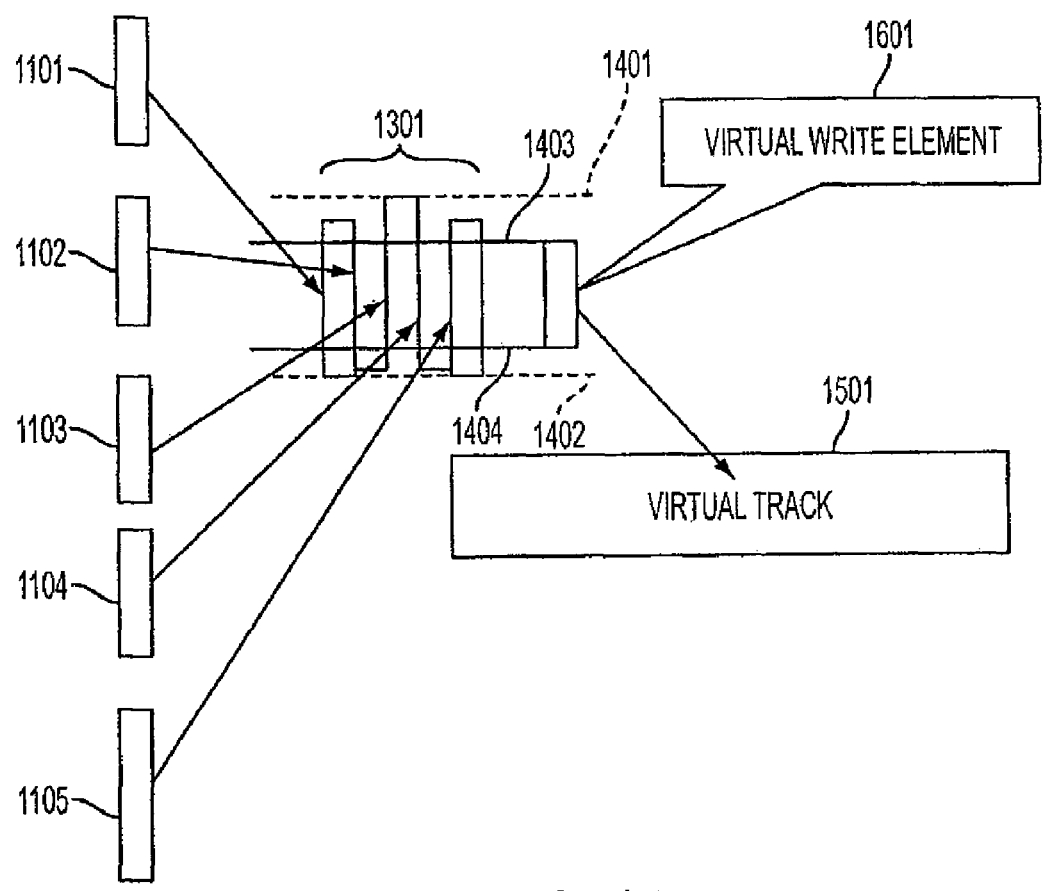
FIG. 1A is a diagram illustrating how to determine a virtual write element.

A tape drive includes one or more heads, each of which has at least one read and/or write element. For example, FIG. 1A depicts five write elements 1101-1105 each residing on the same substrate. Due to manufacturing tolerances, constraints and/or defects, the width and pitch of the write elements 1101-1105 of the tape drive may vary with respect to one another. For example, the width of write element 1105 is greater than the width of write element 1104, as depicted in FIG. 1A. Consequently, the width of a physical data track written by write element 1105 is greater than the width of a physical data track written by write element 1104. A physical data track is written by a write element sequentially across the tape, and then the next physical data track written by that write element is written sequentially across the tape adjacent to and partially overwriting the previous physical data track.

In the embodiment shown in FIG. 1A, each write element 1101-1105 belongs to a separate head of the tape drive, where each head resides on the same substrate. Additionally, the pitch between the write elements 1101-1105 i.e., the distance between the write elements of adjacent heads may vary because of manufacturing tolerances. For example, the pitch of write elements 1101 and 1102 is greater than the pitch of write elements 1103 and 1104, as depicted in FIG. 1A.

Although the write elements 1101-1105 are physically spaced apart from one another to write separate physical bands, for purposes of defining a "virtual track" they can be considered to be placed horizontally adjacent to each other, as shown in FIG. 1A, forming an alignment of write elements 1301. As shown in the write element alignment 1301, the ends of the write elements do not align perfectly one with the other due to differing sizes of the write elements and their positioning with respect to each other. Because of this misalignment, the tracks recorded by these write elements do not have identical widths or pitch.

Each write element 1101-1105 writes a unique physical band, and each physical band has multiple physical tracks. An exemplary embodiment of the tape drive shown in FIG. 1A has five write elements, so each band written by the tape drive includes five physical bands, each physical band corresponds to a unique write element. In a given physical band, a write element writes n physical tracks (not shown). Referring to the write element alignment 1301 shown in FIG. 1A, if the nth physical track of each physical band, corresponding to each write element 1101-1105, or collectively the $n^{th}$ logical track, are stacked on top of one another, the union of the written track data of each physical track would fall between the dashed lines 1401-1402 shown in FIG. 1A. This is because the variations in width of the write elements 1101-1105 extend between the dashed lines 1401 and 1402. In an exemplary embodiment, the top and bottom dashed lines 1401 and 1402 bound the region defined by the various widths of write elements 1101-1105. For example, since the write element 1103 extends the farthest among the write elements toward the top, the physical track written by write element 1103 defines the dashed line 1401. Similarly, the physical data track written by the write element that extends the farthest down (write element 1101 or write element 1105) defines the dashed line 1402. The region corresponding to the intersection of the write elements in write element alignment 1301 is defined as a virtual track 1501 which is shown in FIG. 1A as the area between 1403 and 1404. The virtual track 1501 can be considered as having a width defined by 1403 and 1404. The virtual track 1501 is a track written by a virtual write element 1601. As shown, the virtual write element 1601 has a width and position that corresponds to the intersection of write elements 1101-1105. Accordingly, the virtual write element 1601 writes a virtual track 1501.

Figure 1B:
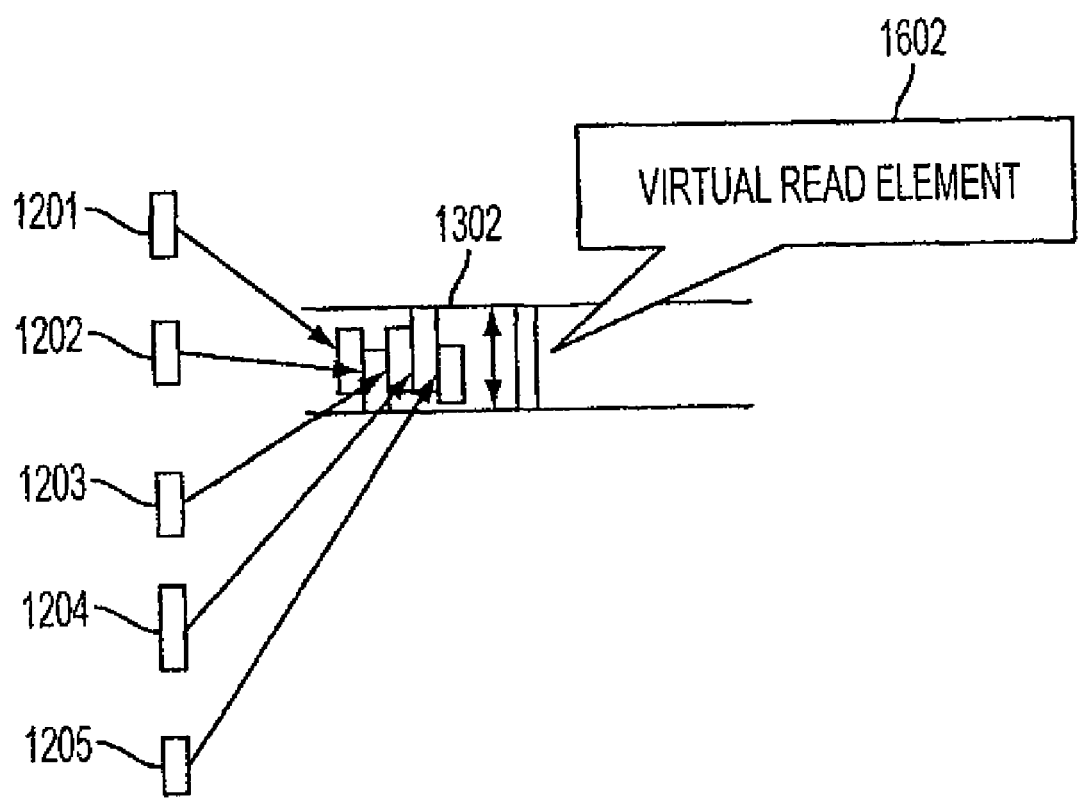
FIG. 1B is a diagram illustrating how to determine a virtual read element.

In FIG. 1B, read elements 1201-1205 are shown. Each read element 1201-1205 belongs to a separate head of the tape drive. The read element 1201 is part of the same head as the write element 1101, the read element 1202 is part of the same head as the write element 1102, and so on. In FIG. 1B, the read elements 1201-1205 also vary in their width and pitch with respect to each other due to manufacturing tolerances/constraints/defects, etc. For example, the pitch between read elements 1201 and 1202 is smaller than the pitch between read elements 1202 and 1203. Additionally, read element 1204 is wider than read element 1203.

A read element alignment 1302 is formed in a similar manner as the write element alignment 1301 is formed. In the read element alignment 1302, the read elements 1201-1205 are mapped horizontally adjacent to each other as shown in FIG. 1B. When reading data that is written by the write elements 1101-1105, dimensional stability, environmental conditions and manufacturing defects may have caused errors in the position and width of the written tracks. Therefore, since the tracks may no longer be much wider than is necessary to read them, if a read element of a first head is aligned to read its respective track, another read element of a second head may not be able to read its respective track due to alignment errors (that also might be caused by manufacturing defects) in the width and pitch of the read elements 1201-1205. To compensate for these alignment errors, a conventional tape drive writes the data tracks much wider than is necessary when using conventional techniques. This in turn decreases the storage capacity of the tape.

Referring to reading element alignment 1302, a virtual read element 1602 is defined as the union of read elements 1201-1205. The width of the virtual read element 1602 is the minimum width of a track that can be guaranteed to be read by each of the actual read elements 1201-1205. If the width of each residual physical track that is partially overwritten by another track is kept at least as wide as the width of the virtual read element 1602, then the tape drive is able to read data from a logical track. That is, each read element 1201-1205 is able to simultaneously read valid data of its respective physical track corresponding to the logical track. Accordingly, the width of the virtual read element 1602 corresponds to the smallest track width that is guaranteed to be read by any of the read elements 1201-1205 despite differences in size and pitch of those read elements.

Figure 1C:
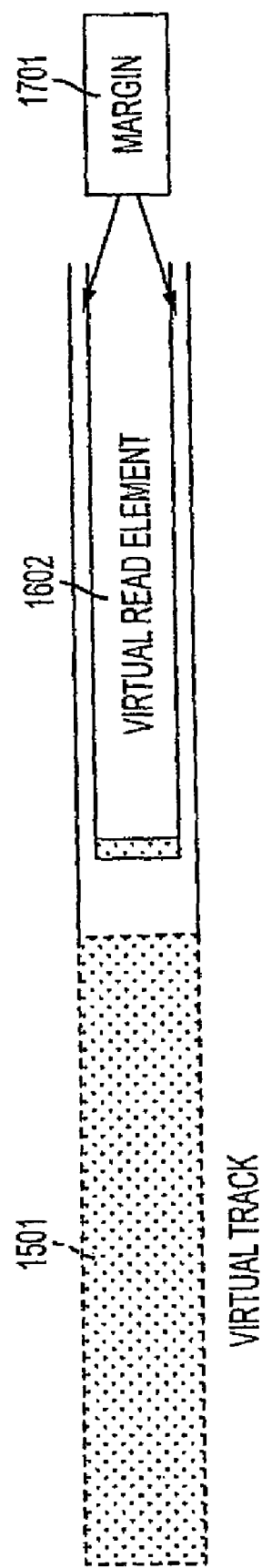
FIG. 1C is a diagram illustrating the relationship between the width of a virtual track, the width of a virtual read element, and the margin between the two.

The difference between the width of the virtual write element 1601 and the width of the virtual read element 1602 corresponds to a virtual track margin 1701 depicted in FIG. 1C The virtual track margin defines the maximum amount of possible overlap between adjacently written physical tracks, as explained in greater detail below. Ideally, the amount of overlap is less than this maximum allowable amount of overlap. A buffer margin may be kept i.e., where the current track to be written overwrites the previously written track less than an amount equal to the virtual track margin. In other words, the width of the residual track is the width of the virtual read element plus some margin. This is so that any residual position servo errors during writing or reading may be absorbed by the buffer margin. Accordingly, when writing a current track, to guarantee that each of the read elements can read the previous track, the current track must be written so that it overwrites, or trims, the previous track at most so that the width of the residual track remains equal to or greater than the width of the largest virtual read element. If the read elements of each head are positioned such that the virtual read element is within the boundaries of the virtual track, each read element will be able to read data of a respective physical track.

Figure 1D:
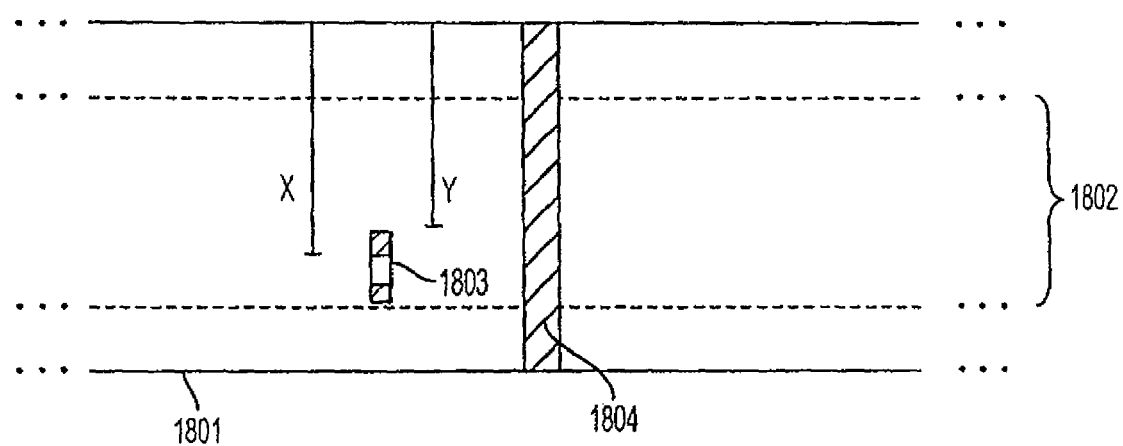
FIG. 1D is a diagram illustrating virtual and physical elements of a tape drive.

For example, referring to FIG. 1D, a first physical track 1801 is written by a write element 1804. The first track 1801 is wider than the virtual track 1802. The first track 1801 is read by the read element 1803. In an exemplary embodiment, the un-shaded portion of read element 1803 depicts the physical read element part of the same head as the write element 1804. The shaded portion of read element 1803 shows the width of a virtual read element for the exemplary tape drive of FIG. 1D. If the next track written by write element 1804 overwrites the first track 1801 by an amount indicated by distance X shown in FIG. 1D, then track 1801 is still readable by the read element 1803. However, the read elements of adjacent heads may not be able to read their respective tracks simultaneously because the subsequently written track extends into and intersects the virtual read element. If, on the other hand, the subsequently written track is written by write element 1804 so it overwrites track 1801 by an amount indicated by distance Y shown in FIG. 1D, and the other write elements of the other heads perform analogous writing operations, then each read element of each head of the tape drive can simultaneously read its respective physical track. This is because the subsequently written track does not extend into and intersect with the virtual read element.

Figure 2A:
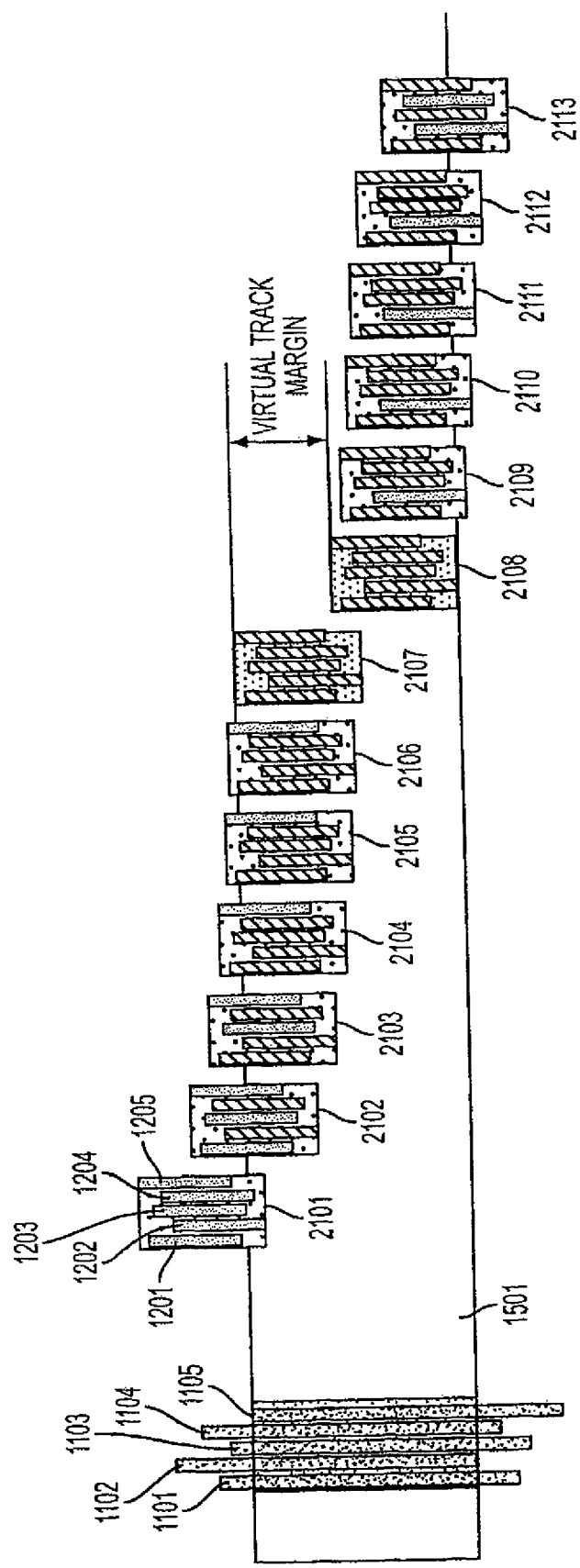
FIG. 2A is a diagram illustrating how to detect the presence of and width of a virtual track.

FIG. 2A shows a technique for reading and writing a data track according to an exemplary embodiment of the invention. With respect to writing the data track, FIG. 2A shows that the intersection of the tracks (written by write elements 1101-1105), when all mapped to the same location, defines the virtual writer, and hence, the virtual track 1501. FIG. 2A further shows the process of reading the virtual track 1501 at various positions. In the exemplary embodiment, in position 2101, all of the reader elements 1201-1205 are positioned on or above the edge of their respective written physical data track of a logical track corresponding to virtual track 1501. Although the pitch between the read elements may vary such that read element 1201 is closer to read element 1202 than read element 1202 is to read element 1203, the position of the read elements with respect to each other remains constant throughout. For example, if read element 1201 is moved up X units, then the read elements 1202-1205 are also moved up X units. Similarly, the pitch between the write elements 1101-

1105 may vary but the position of the write elements 1101-1105 with respect to each other remains constant.

Figure 2B:
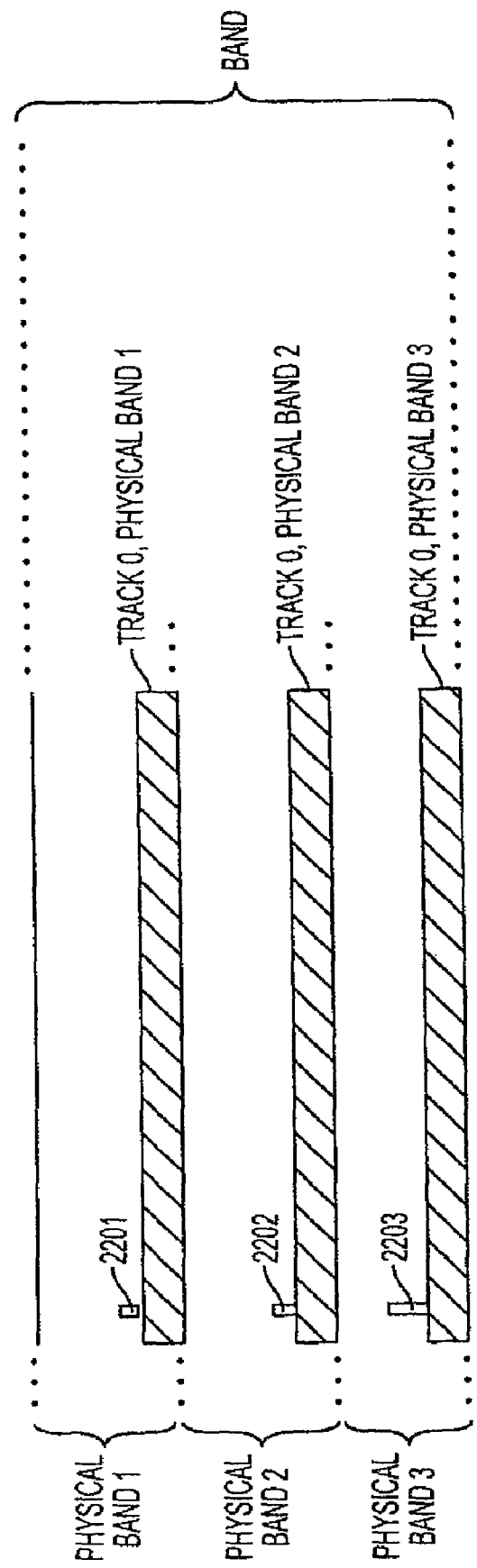
FIG. 2B is a diagram illustrating a process of reading virtual tracks by their respective read elements.

For example, FIG. 2B shows a tape drive with three heads. Each head has a write element and a read element. In FIG. 2B, a physical track 0 is written by each write element in its respective physical band 1-3. In other words, a first write element writes physical track 0 in physical band 1, a second write element writes physical track 0 in physical band 2, and a third write element writes physical track 0 in physical band 3. The physical tracks 0 of physical bands 1-3 comprise logical track 0. When all the read elements 2201-2203 are positioned above their respective physical data track 0, as depicted in FIG. 2B, none of the read elements can read the data tracks. When read elements 2201-2203 are moved incrementally downward, read elements 2202 and 2203 are the first to be positioned over their track 0 because they are positioned closer to the track than is read element 2201. In this example, read element 2202 is the first to read data from its track 0 because read element 2202 is not as wide as read element 2203. That is, the read elements cannot read a track unless the entire element is positioned within the boundaries of the track. If a read element is only partially within a track, interference from the edges of the track will prevent the read element from accurately reading data on the data track. When read element 2202 is first able to read its respective track 0, read element 2203 is only partially over its respective track 0. Therefore, the interference from the boundary of track 0 of physical band 3 will prevent read element 2203 from accurately reading the data track.

In the example depicted in FIG. 2B, as soon as the read element 2201 is entirely within the boundaries of track 0 of physical band 1, all three read elements 2201-2203 can accurately read data from their respective tracks 0. According to the exemplary embodiment, read elements 2201-2203 can be moved further downward and all three of those read elements will still be able to accurately read their respective track 0. However, as read elements 2201-2203 continue to move downward, at a certain point, one of the read elements 2201-2203 will cross a boundary of its respective track 0. At this point, all three read elements 2201-2203 can no longer accurately read their respective track 0, at least not at the same time. The distance from the position where all of the read elements are able to simultaneously read their respective tracks, to the position just before where all of the read elements are no longer able to read their respective tracks defines a virtual track margin.

Instead of considering each physical track individually, all of those tracks can be considered at the same time by considering a virtual data track, as shown in FIG. 2A. Referring back to FIG. 2A, in position 2101, all of the read elements 1201-1205 are positioned on or above an edge of their respective physical track n, corresponding to a logical track n. In position 2101, no read element 1201-1205 can accurately read data from its respective track as indicated by the light shading of each read element. Positions 2102-2113 show the read elements being incrementally moved downward across the virtual track 1501 to determine the location of the boundaries of the virtual track. As shown in position 2102, read elements 1202 and 1204 can accurately read data from their respective tracks, as indicated in the figure by cross-hatching. However, in this position, read elements 1201, 1203 and 1205 cannot accurately read data. As can be seen by the positions of the write elements 1102 and 1104, in position 2102, the read elements 1202 and 1204 are within the boundaries of their respective physical tracks and as such can read their respective data tracks.

As the read elements continue to move downward, in position 2103, read element 1201 is also able to accurately read data from its respective track. In position 2104, read element 1203 additionally is able to accurately read data from its respective track, as it also is in positions 2105 and 2106. In position 2107 all the read elements can now read data from their respective tracks. Accordingly, this signifies a boundary of the virtual track. The read elements continue to be moved across the track to position 2108 where all of the read elements continue to read data. However, in position 2109 one of the read elements, the read element 1202, no longer can read data from its respective track. This is because, as can be seen from the position of write element 1102, in position 2109, with respect to the position of the read element 1202, the read element 1202 is no longer within the boundaries of its respective physical track. Transitioning from a position where all of the read elements read data to a position where at least one of the read elements does not read data signifies detection of another boundary of the virtual track. In position 2110, another read element, read element 1204, also can no longer read its respective physical track. Eventually, in position 2113, none of the read elements 1201-1205 can read their respective tracks. As shown in FIG. 2A, all the read elements read their respective tracks only within the boundaries of the virtual track 1501.

Figure 3:
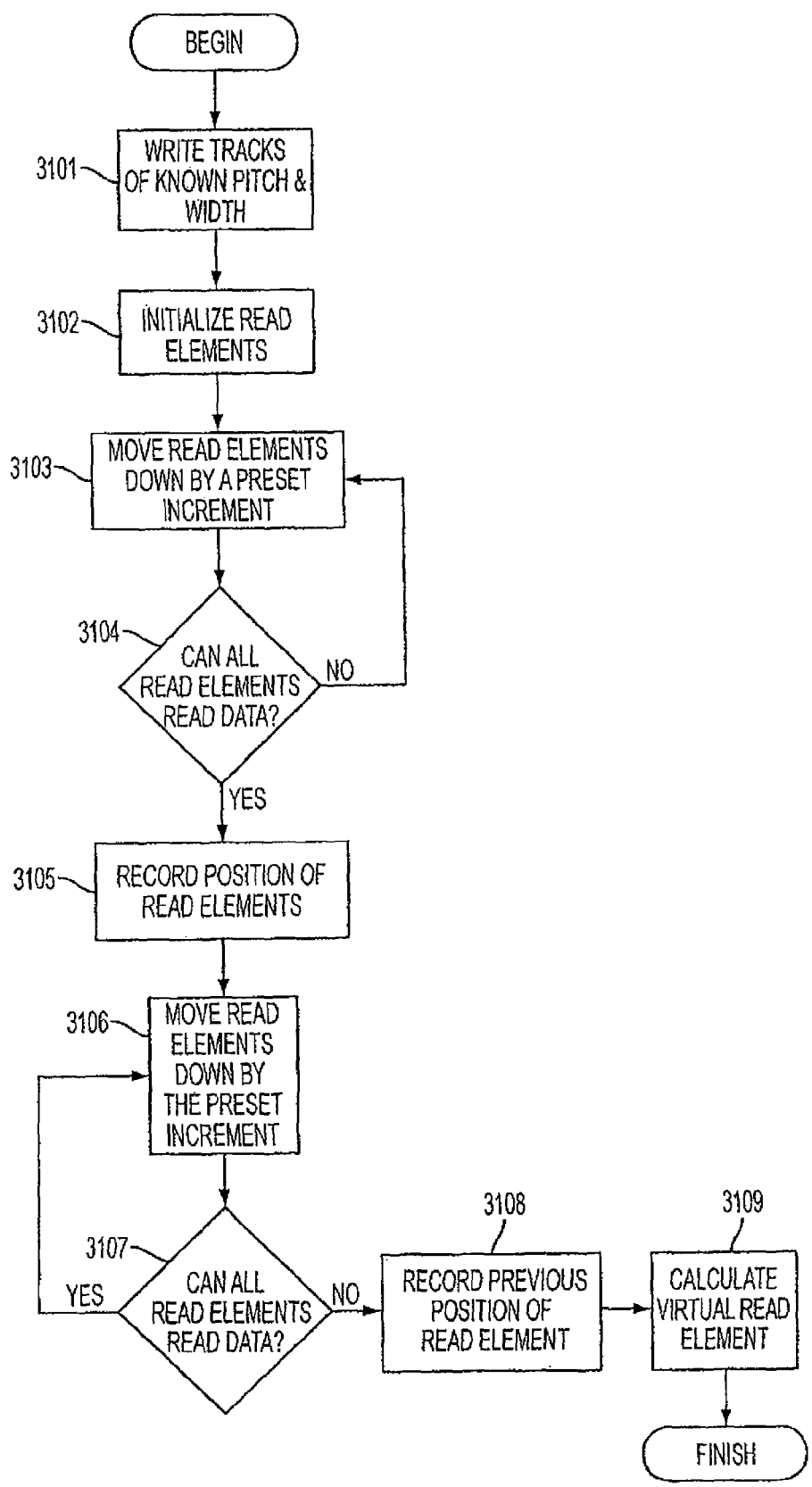
FIG. 3 is a flowchart illustrating a method of determining a virtual read element.

FIG. 3 is a flowchart illustrating an exemplary process of determining a virtual read element for a tape drive. Initially, in operation 3101 tracks of a known width are written onto a tape. For example, a special device may be constructed with much stricter tolerances, where each write element is manufactured to have identical width and pitch of known values. The device may be used to write tracks onto a master tape. Since the width and pitch of the write elements of this special device are known, the width and pitch of the data tracks written on the master tape are also known. Once the tracks are written, the tape is then provided to a manufactured tape drive that will be used for recording data onto tapes and/or reading data from the tapes.

Accordingly, as shown in FIG. 3, in operation 3102, the read elements of the conventional tape drive are initialized. During initialization, the read elements are positioned, with respect to a logical track, so that none of the read elements is entirely over its respective physical track of the logical track. For example, the read elements may all be initialized such that they are either on or above a top edge of their respective physical track. Hence, the read elements cannot read data from their respective physical tracks. In operation 3103, the read elements are moved down by a preset increment.

In operation 3104, a controller, for example, that controls the read and write elements of the tape drive checks if all the read elements can accurately read data on their respective tracks. Unless all of the read elements read data from their respective tracks, the process goes back to operation 3103 to again move the read elements. On the other hand, if all of the read elements can accurately read data from their respective tracks, then in operation 3105, the current position of a first read element is stored in memory, as a start position.

Next, in operation 3106, the read elements are moved down again by the preset increment. In operation 3107, the controller again checks if all of the read elements can still read the data on their respective tracks. As long as all the read elements can read data from their respective tracks, the process loops between operations 3106 and 3107.

If all the read elements can not read data from their respective tracks in operation 3107, the process proceeds to operation 3108. In operation 3108, the previous position of the first read element is stored in memory as an end position. For example, the position of the first read element in operation 3108 minus the preset increment may be stored as the end position.

As an alternative, the position of the first read element may be stored each time all of the read elements can read the data as an end position. In other words, each time all of the read elements can read the data, the end position is overwritten with a new value until one or more of the read elements can no longer read data on its respective track.

Next, in operation 3109, the virtual read element is determined. The virtual read element is determined at least in part from the start and end positions of the first read element stored in memory. For example, the distance between the start and end positions of the first read element is calculated as the virtual track margin. Since the width of all the written tracks is uniform and is known as indicated in operation 3101, the width of the virtual read element can be determined. The width of the virtual read element is the difference between the known width of the written tracks and the determined virtual track margin. The virtual read element is typically determined ahead of time and set as a predetermined constant for the manufactured tape drive.

The predetermined constant of the virtual read element for a population of tape drives may be set based on the maximum determined virtual read element among the population. For example, if the widest determined virtual read element among the population of tape drives is 5 microns, then the width of the virtual read element for all the tape drives among the population is set as 5 microns. Additionally, the predetermined value for the virtual read element may include a buffer amount. For example, if the widest determined virtual read element among the population of tape drives is 1 micron, then the width of the virtual read element for all the tape drives among the population may be set as 1.1 microns. That is, the determined width of 1.0 microns plus 0.1 microns as a manufacturing margin value or buffer.

Figure 4:
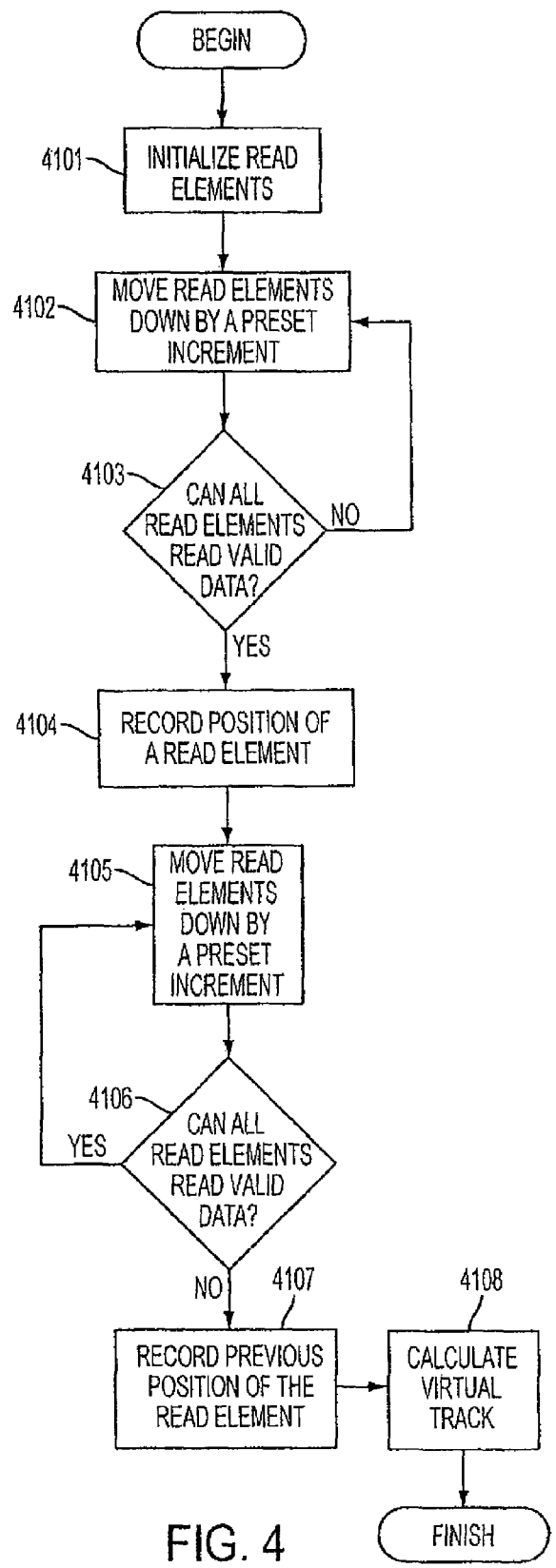
FIG. 4 is a flowchart illustrating a process of determining a virtual track width.

FIG. 4 is a flowchart illustrating an exemplary process of determining the virtual track for recording data onto the tape by a manufactured tape drive. The virtual read element for the tape drive was determined as explained above with reference to FIG. 3. Virtual tracks for recording data are determined by the tape drive. For example, the tape drive can determine the virtual track after the writing of each logical track.

For example, as depicted in FIG. 4, in operation 4101, the read elements are initialized. During initialization, the read elements are positioned, with respect to a logical track, so that none of the read elements is entirely over its respective physical track. The read elements all can be initialized such that they are either on or above a top edge of their respective physical track. Hence, the read elements are initialized so they cannot read data from their respective physical tracks. In operation 4102, the read elements are moved down by an incremental amount. Such an incremental amount can be a preset increment. In operation 4103, a controller, for example, that controls the read and write elements of the tape drive checks if all of the read elements can read data on their respective tracks. Unless all of the read elements read data from their respective tracks, the process goes back to operation 4102. On the other hand, if all of the read elements can read data from their respective tracks, then in operation 4104 the current position of a first read element is stored in memory as a start position.

Next, as shown in FIG. 4, in operation 4105, the read elements are moved down again by an incremental amount, which can be a preset increment. In operation 4106, the controller again checks if all of the read elements can still read the data on their respective tracks. As long as all of the read elements can accurately read data from their respective tracks, the process loops between operations 4105 and 4106. If all of the read elements can not read valid data from their respective tracks in operation 4106, the process then proceeds to operation 4107.

In operation 4107, the previous position of the first read element is stored in memory as an end position. That is, the end position of the first read element where all of the read elements were able to read data from their respective tracks is stored. As an alternative, the position of the first read element may be stored each time all of the read element can read the data. This position will be stored as an end position. In other words, each time all of the read elements can read the data, the end position is overwritten with a new value until one or more of the read elements can no longer read data on its respective track.

Next, in operation 4108, the virtual track is determined. The virtual track is determined from the start and end positions of the first read element stored in memory. For example, the distance between the start and end positions of the first read element is calculated as the virtual track margin, as explained with reference to FIG. 3. Since the virtual read element is predetermined for a manufactured tape drive as also explained with reference to FIG. 3, the virtual read element width is known. The virtual track width is then calculated as the sum of the width of the virtual read element and the determined virtual track margin.

Also, in another exemplary embodiment, the edges of the virtual track can be determined if the virtual track width is known. The start position of the first read element corresponds to a first edge of the virtual track. The second edge of the virtual track is determined by adding the virtual track width amount to the location of the first edge. By locating the edges of the virtual track, the controller can compensate for various alignment errors resulting from manufacturing defects, environmental conditions and/or other elements, as explained in greater detail below.

Reducing Effects of Dimensional Stability

Figure 5A:
FIGS. 5A-5I are diagrams illustrating the effects of the dimensional stability of a tape and errors due to dimensional stability effects.
Figure 5B:
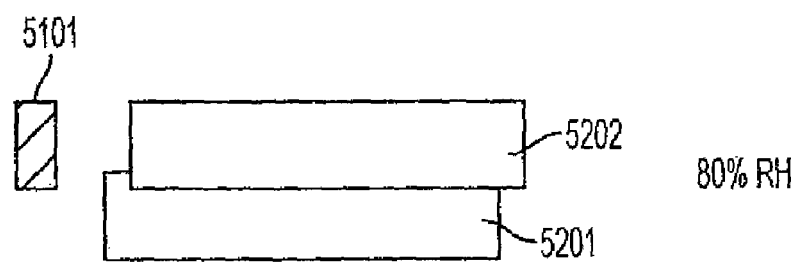
Figure 5C:
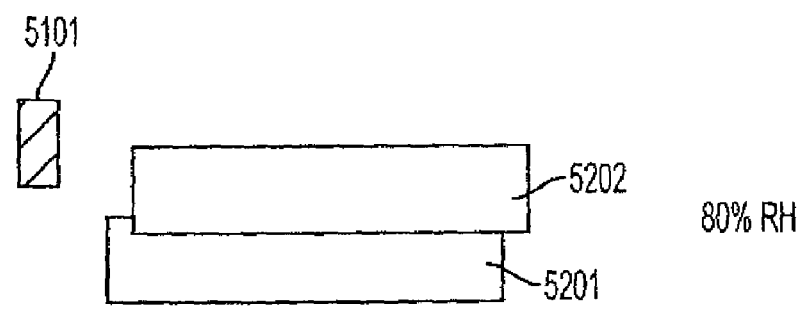

FIGS. 5A-5C are diagrams illustrating effects of environmental conditions in the writing of data by a tape drive. FIG. 5A illustrates a position of a write element 5101 when writing data track 5201 in an environment of 80% relative humidity. The width of written track 5201 corresponds to the width of write element 5101. FIG. 5B illustrates the position of the write element 5101 when writing the next data track 5202 in the same environment. The data track 5202 overwrites a portion of the previously written data track 5201, thereby trimming the width of track 5201. The width of the data track 5202 corresponds to the width of write element 5101. Data track 5202 is shown in the FIGS. 5A-5C as starting and ending slightly later than data track 5201 for clarity purposes only so the position of previous track 5201 and the amount of overlap can be clearly seen. In another embodiment, the data track 5202 may start at the same location as the data track 5201. In FIG. 5C, the write element 5101 is moved up in preparation for writing a next track, but the next track is not yet written. In FIG. 5C the environment condition has not yet changed.

Figure 5D:
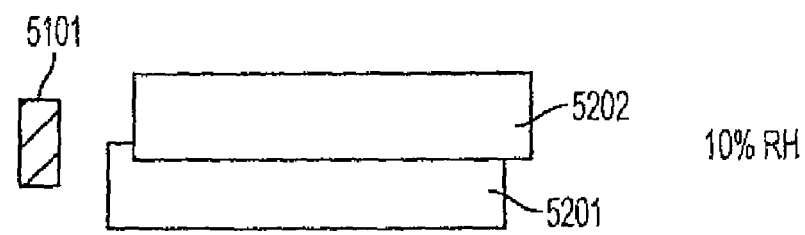

In FIG. 5D, the relative humidity is now 10% resulting in the tape shrinking due to the relatively dry environment. According to the example shown in FIG. 5D, the tape as a whole shrinks and both data tracks 5201 and 5202 move up as a result of the tape shrinking. The individual data tracks 5201 and 5202 also shrink and become narrower. The write element 5101 in FIG. 5D, however, is not significantly affected by the change in humidity and thus has not moved from its position in FIG. 5C. Because the relative position of the written tracks 5201-5202 has moved with respect to the write element 5101, if conventional techniques were used to write the next track, the write element would overwrite all or part of previously written tracks 5201-5202 such that previously written tracks 5201 and 5202 are no longer readable. An embodiment of the invention that compensates for these environment conditions so that the tracks remain readable, is described next.

Figure 5E:
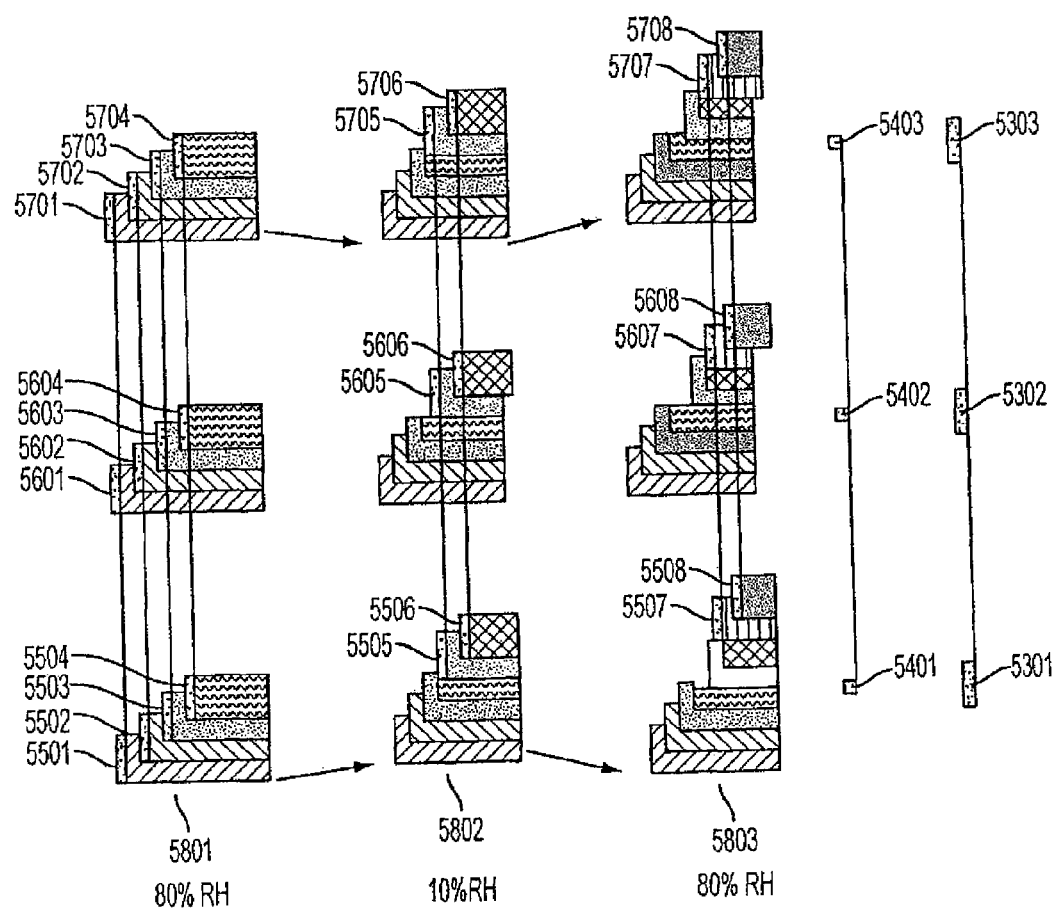

FIG. 5E shows three operations 5801-5803 that illustrate writing of tracks on a tape in different environmental conditions. In operation 5801, four tracks (5501-5504, 5601-5604, and 5701-5704) are written by each write element 5301-5303 at 80% relative humidity. In operation 5802, two additional tracks (5505, 5506, 5605, 5606, and 5705, 5706) are written by each write element 5301-5303 at 10% relative humidity. In operation 5803, an additional two tracks (5507, 5508, 5607, 5608, and 5707, 5708) are written by each write element 5301-5303. As shown in FIG. 5E by the vertical line linking the write elements 5301-5303, the write elements 5301-5303 are connected with each other at a fixed pitch. In other words, when the write element 5301 moves up by X units, the write elements 5302 and 5303 also move up by X units. Although the fixed pitch between the write elements can be non-uniform, meaning that the pitch between write elements 5301 and 5302 may be different from the pitch between write elements 5302 and 5303, the write elements 5301-5303 still move together by same number of units.

In operation 5801, four logical tracks (i.e. physical tracks 5501-5504, 5601-5604, and 5701-5704) are written by each write element 5301-5303 at 80% relative humidity. As shown in operation 5801, tracks 5501-3504, 5601-5604, and 5701-5704 are written such that they overwrite, or trim, a portion of a previously written track. The pitch between the top most write element 5303 and the middle write element 5302 may not equal the pitch between the middle write element 5302 and the bottom write element 5301. Therefore, the pitch of the written physical tracks of a logical track may also vary. Similarly, the read elements 5401-5403 are connected to each other at a fixed, but not necessarily uniform, pitch. In the provided exemplary embodiment, the read element 5401 and the write element 5301 are part of the same first head, the read element 5402 and the write element 5302 are also part of the same second head, and the read element 5403 and the write element 5303 are part of the same third head.

In operation 5801, write element 5301 first writes track 5501. The write element 5301 then writes track 5502, partially overwriting track 5501. Subsequently, the write element 5301 writes track 5503 partially overwriting track 5502, and writes track 5504 partially overwriting track 5503. The VTS technology is employed to determine the amount of overlap, i.e. the width of the residual track. For example, before write elements 5301-5303 write the tracks 5502, 5602, and 5702, respectively, the three read elements 5401-5403 are used to find the bottom edge of the virtual track corresponding to the previous logical track (i.e. physical tracks 5501, 5601, and 5701). With the position of the bottom edge of the previous virtual track, the position of a next virtual track, corresponding to the logical track that includes the physical tracks 5502, 5602, and 5702, may be chosen such that a minimum width of the previous virtual track is preserved. To guarantee that the trimmed virtual track is readable, its width must be at least the width of the virtual reader plus some margin that can be a predetermined margin.

Figure 5F:
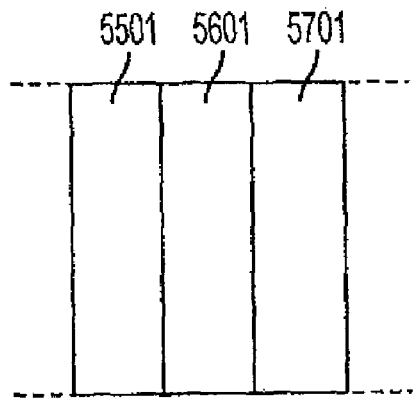
Figure 5G:
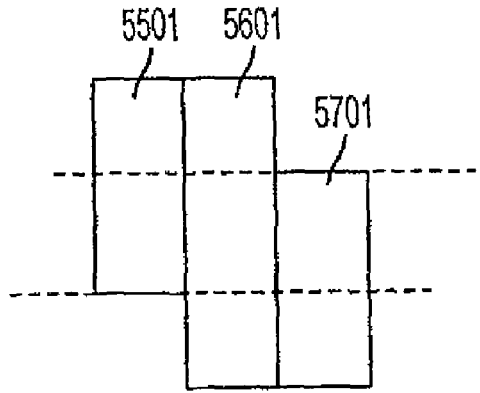

The variation in track width, due to the dimensional stability of the tape is intrinsically accounted for when using VTS technology because the minimum widths of previously written tracks are preserved regardless of any variations in position due to environmental changes. For example, if the width of the tape shrinks because the tape is in a dry environment, the widths of the tracks shrink. When the position of a virtual track is chosen, this shrinkage is automatically accounted for because the width of the previous virtual track is preserved based on measurements taken in the current environment. For example, FIG. 5F illustrates the width and relative pitch of tracks 5501, 5601 and 5701 at 80% relative humidity. The width of the track is measured in the vertical direction, across the track. In the exemplary embodiment of FIG. 5F, tracks 5501, 5601, and 5701 all have equal width and equal pitch. If the environment of the tracks is changed to 10% relative humidity, as in FIG. 5G, the tracks become deformed. In FIG. 5G, the individual tracks shrink while their pitch remains the same. In other words, FIG. 5G illustrates the shrinking of individual tracks without accounting for shrinking of the tape itself. As tracks 5501 and 5701 shrink, the area of intersection of tracks 5501, 5601 and 5701 is decreased.

Figure 5H:
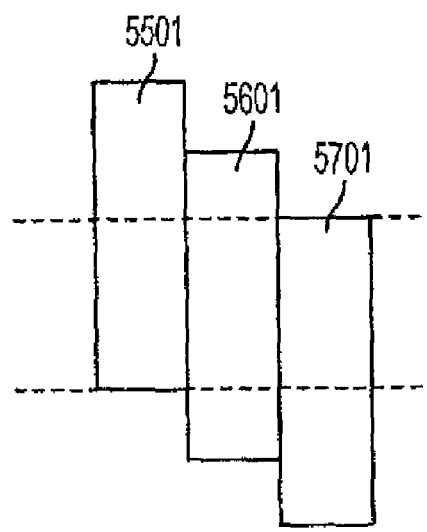

In FIG. 5H, the pitch of tracks 5501 and 5701 is decreased due to a change in relative humidity from 80% to 10%. That is, both tracks 5501 and 5701 move toward the center of the tape. FIG. 5H illustrates the tracks moving toward the center of the tape while the width of tracks 5501, 5601 and 5701 is shown as unchanged. As in FIG. 5G, in FIG. 5H, the area of intersection of the tracks 5501, 5601 and 5701 is decreased due to 5501 moving up (the pitch between 5501 and 5601 decreased) and 5701 moving down (the pitch between 5601 and 5701 decreased).

Figure 5I:
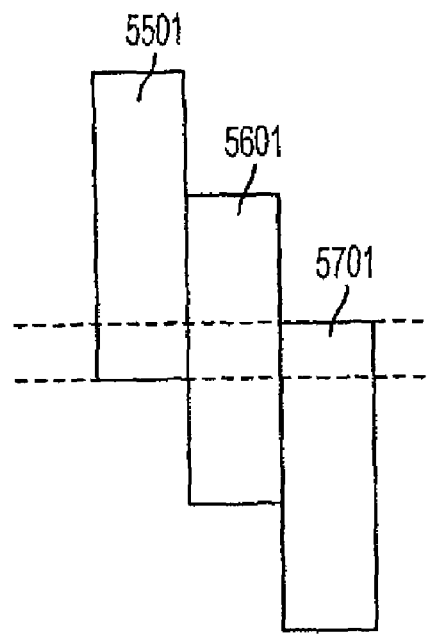

FIG. 5I shows the combined effect of shrinking of the tracks and the tape as, for example, respectively depicted in FIGS. 5G and H. Specifically, the width of the written tracks 5501 and 5701 shrinks and the pitch between written track 5601 and both written tracks 5501 and 5701 decreases. Accordingly, the virtual track width in FIG. 5I, which is the distance between the two dashed lines, is smaller than the virtual track widths in either of FIG. 5G or 5H. Since a virtual track is determined in a current environment, the change in position of the virtual track edges in each of the examples depicted in FIGS. 5G, 5H and 5I, is detected, and accounted for when determining a position to place the next virtual track in order to write the next logical track.

Returning to FIG. 5E, in operation 5802, when the environment is changed from 80% to 10% relative humidity the tape shrinks (becomes narrower). Therefore, the location of the tracks with respect to the write elements shifts. In operation 5802, the tracks 5701-5704 of the top channel and the tracks 5501-5504 of the bottom channel both shift toward the tracks 5601-5604 of the center channel. The width of the individual tracks may also shrink. Assuming that track 5504 shrunk the most in operation 5802, the virtual track width would be limited by the width of track 5504. Therefore, the write elements 5301-5303 are moved up such that a sufficient width of track 5504 is maintained.

As with FIGS. 5A-5D, although the track 5502 is displayed as being written with a horizontal offset with respect to track 5501, this is done for clarity purposes only to show the overlap between tracks. The write elements 5302 and 5303 write tracks 5601-5604 and 5701-5704, respectively, in a similar way as described for the write element 5301. Additionally, the positions of the write elements 5301-5303 are shown in operations 5801-5803 to help conceptualize the writing operation. In the example, the width of the previous virtual track is checked at predetermined intervals or before writing a track. Typically, the environmental conditions change gradually. Accordingly, in the example, the virtual width of the track is not calculated before each write operation but only at preset time intervals. Alternatively, the virtual track width can be determined based on other conditions, such as after a certain amount of time elapses between write operations, or after a predetermined number of write operations.

In operation 5803, the environment is changed back to 80% relative humidity from 10% relative humidity, and therefore the tape expands. The position of previously written track 5706 moves up with respect to the write element 5303, and the position of previously written track 5506 moves down with respect to the write element 5301. The width of the tracks also can expand. The VTS technology is utilized to determine where to position the write elements of each head such that the minimum track width of each previously written physical track of the logical track is maintained.

For example, assuming, in operation 5803, that each track 5506, 5606, and 5706 expanded in width the same amount but that the pitch between tracks 5706 and 5606 increased greater than the pitch between tracks 5506 and 5606, the virtual track width would be limited by track 5706. Therefore, the write elements 3301-3303 are moved up such that a sufficient width for track 5706 is maintained so that it can be read.

Writing Data Tracks Using VTS

Figure 6:
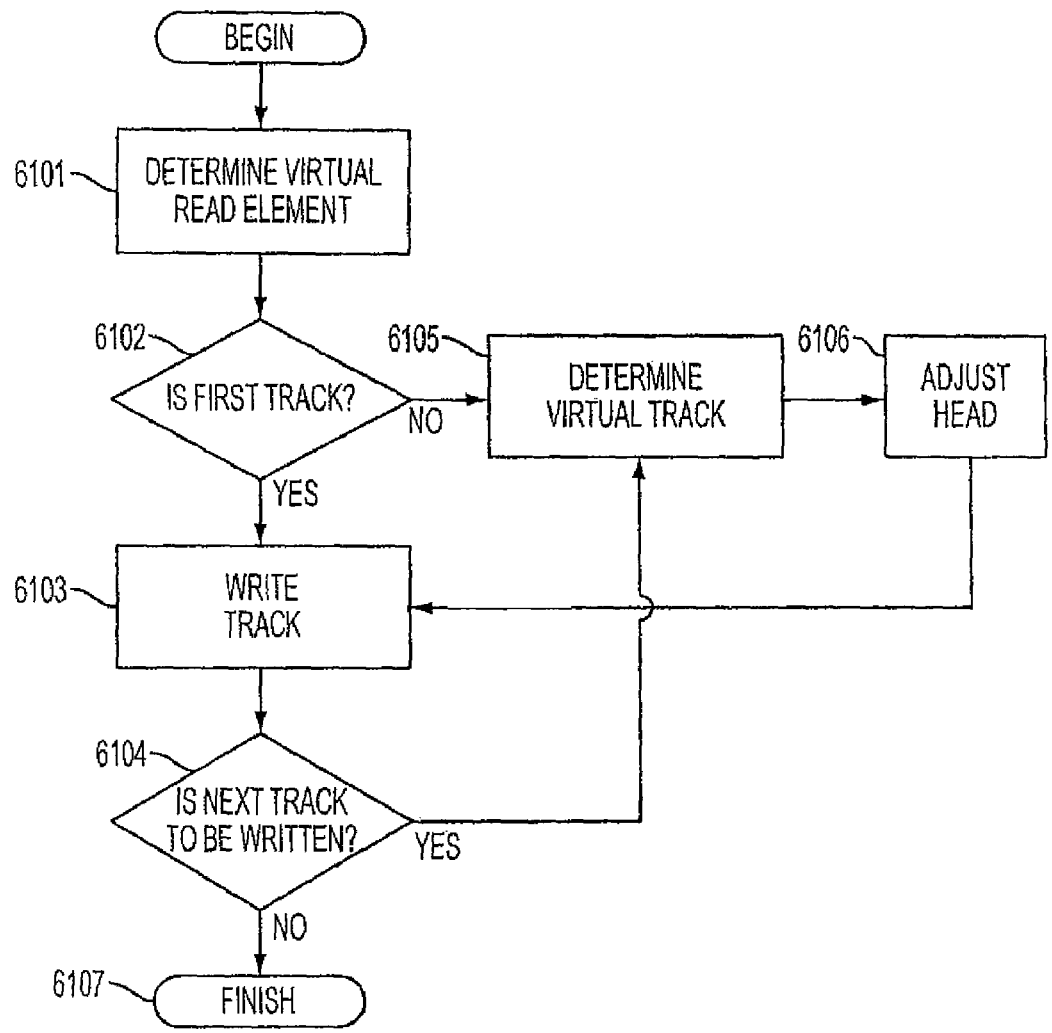
FIG. 6 is a flowchart illustrating a method of writing data while accounting for errors due to the effects of dimensional stability.

FIG. 6 is a flowchart illustrating an exemplary process of determining where to position a write element when writing tracks. In operation 6101, the characteristics of the virtual read element are determined, for example as described in FIG. 3. Next, in operation 6102, the controller determines if the track to be written is the first track. If the track to be written is the first track, then the track is written in operation 6103. The controller may then check if there is a next track to be written in operation 6104. If there is a next track to be written or if the track to be written is not a first track, then the bottom edge of the virtual track corresponding to the previous logical track is determined using the VTS technique, for example as described with reference to FIG. 4. The virtual track width can vary depending on environmental conditions. For example, when humidity decreases, the tape may shrink decreasing the virtual track width.

In operation 6106, the head is adjusted such that the minimum width of the previous virtual track is preserved. Specifically, the head is adjusted so that the write element overwrites the previous track such that the residual track maintains a minimum pre-determined width that can be guaranteed to be read. The process then proceeds to operation 6103 to write the data track. If there is no additional track to be written as checked in operation 6104, the process finishes in operation 6108. Otherwise, the process returns to operation 6105 and repeats operation 6105-6106.

Calibration

Figure 7:
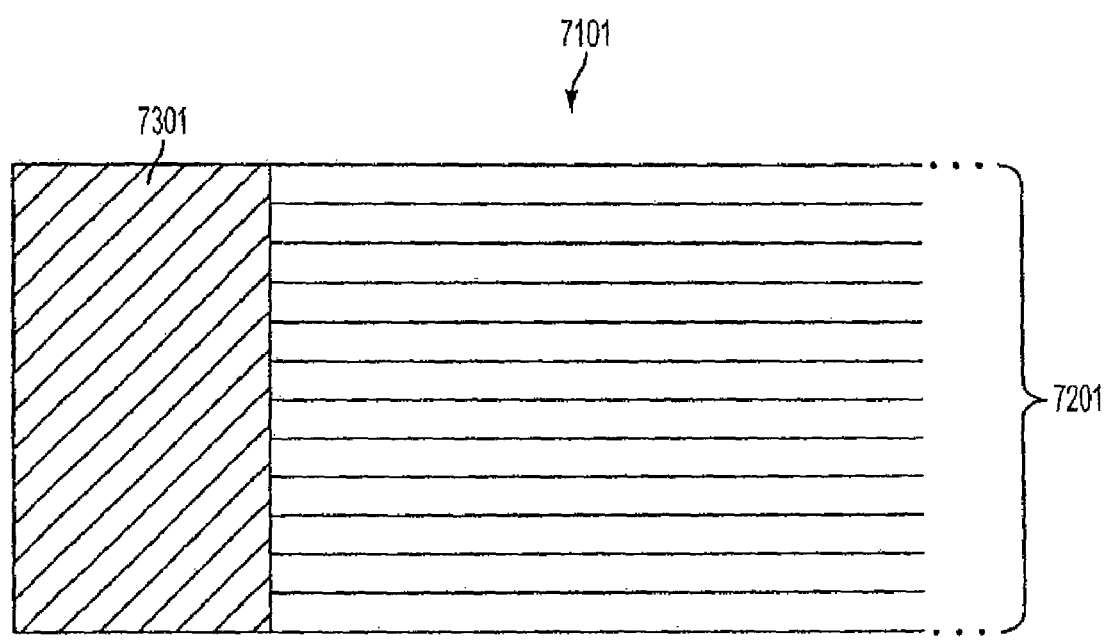
FIG. 7 is a diagram illustrating a reserved area for calibration on a tape.

As explained above, a calibration operation for adjusting the write elements according to the VTS technology may be performed each time before writing a track or at any preset interval, such as after loading a new tape cartridge, after a predetermined time interval, or after writing a predetermined number of tracks. In order to prevent customer data from being overwritten when performing the calibration, space may be reserved at the beginning of the tape. As shown in FIG. 7, an exemplary tape 7101 includes a number of written data tracks 7201. These tracks extend for the length of the tape as indicated by ellipses in the figure. At the beginning of the tape, area 7301 is reserved for calibration purposes. The calibration tracks are written and overwritten in area 7301 without affecting the integrity of customer data. The VTS process also can be applied during a data append process.

Proof of Concept

Figure 8:
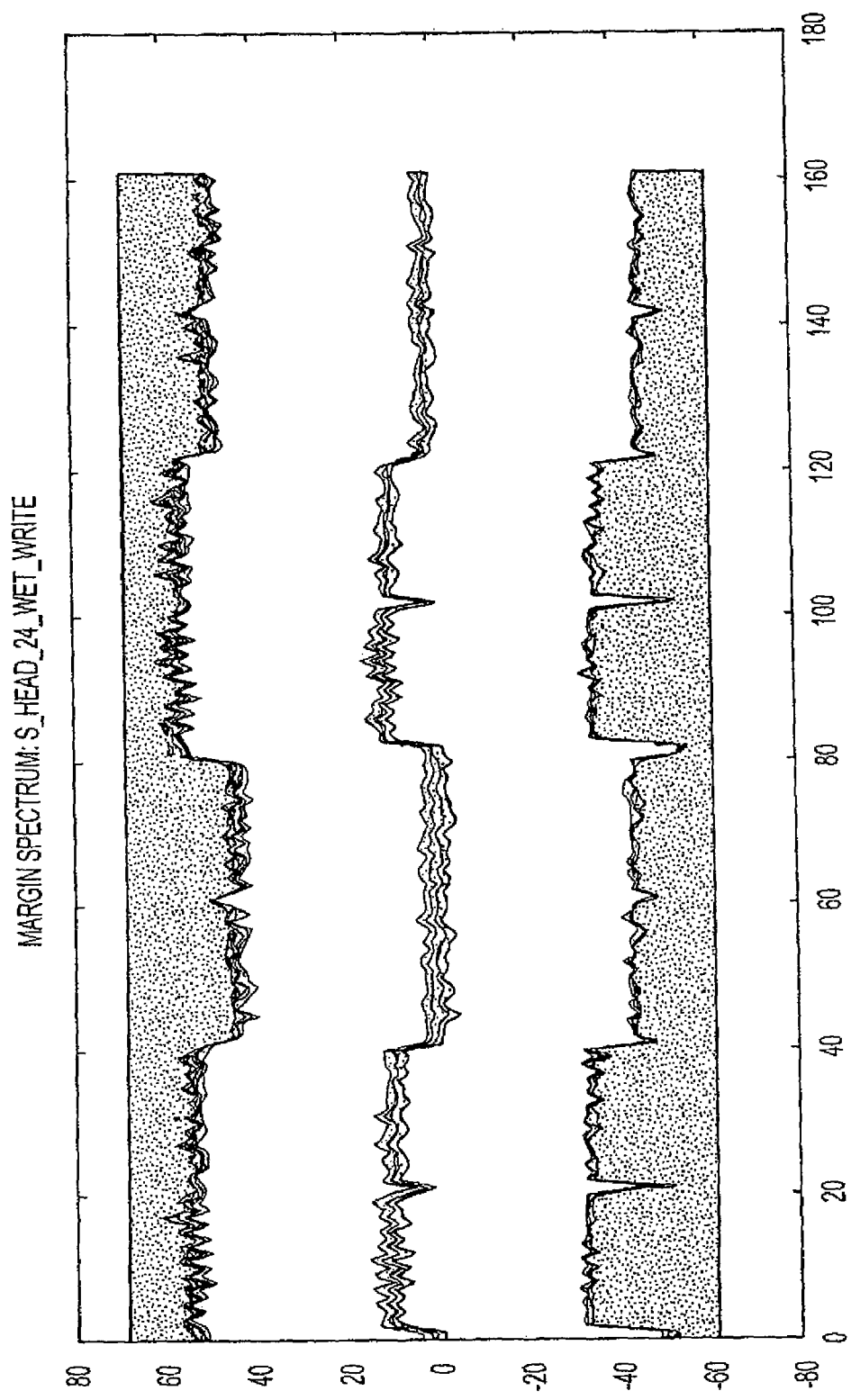
FIG. 8 is a chart illustrating the results of reading data from a tape in an environment having 85% relative humidity that was written in an environment having 85% relative humidity.

FIG. 8 illustrates an analysis of data tracks written at 85% relative humidity and being read at 80% relative humidity. When a data track was written, this data track was analyzed by moving the read elements of each head from an area above the written track to an area below the written track, similar to the exemplary procedure described with reference to FIG. 2A. The shaded regions existing at either extreme (at +6.0 microns and −6.0 microns) represent areas where no read element can read data, and the white regions represent areas where all read elements can read data. The x-axis represents the track count, and the y-axis is the distance from the center of the track in units of 0.1 microns.

As shown in FIG. 8 with respect to track 1 for example, when all the read elements are positioned on or above an edge of a respective track (approx. >=+5.5 microns), no read element can read data. Hence, this area is depicted as shaded. As the read elements are moved down together, certain read elements can read data from their respective track before other read elements. This is shown by the region at the boundary between the shaded and white regions at approximately +5.5 microns. In this region, which is referred to as the transition region, each read element is plotted. For example, the read element associated with the top most line of this region is the first read element to read data from its respective track 1. The read element associated with the bottom most line in this region is the last read element to be able to read data from its respective track 1. The white region which extends from approximately +5.0 microns to −5.0 microns for track 1, is where all the read elements are able to read valid data from their respective track 1. Each of the lines in the aforementioned transition region corresponds to a unique read element. The bottom most line in the transition region represents the relatively top most read element (for example, read element 1205 in FIG. 2A), and the top most line in the transition region represents the relatively bottom most read element (for example, read element 1202 in FIG. 2A).

Figure 9:
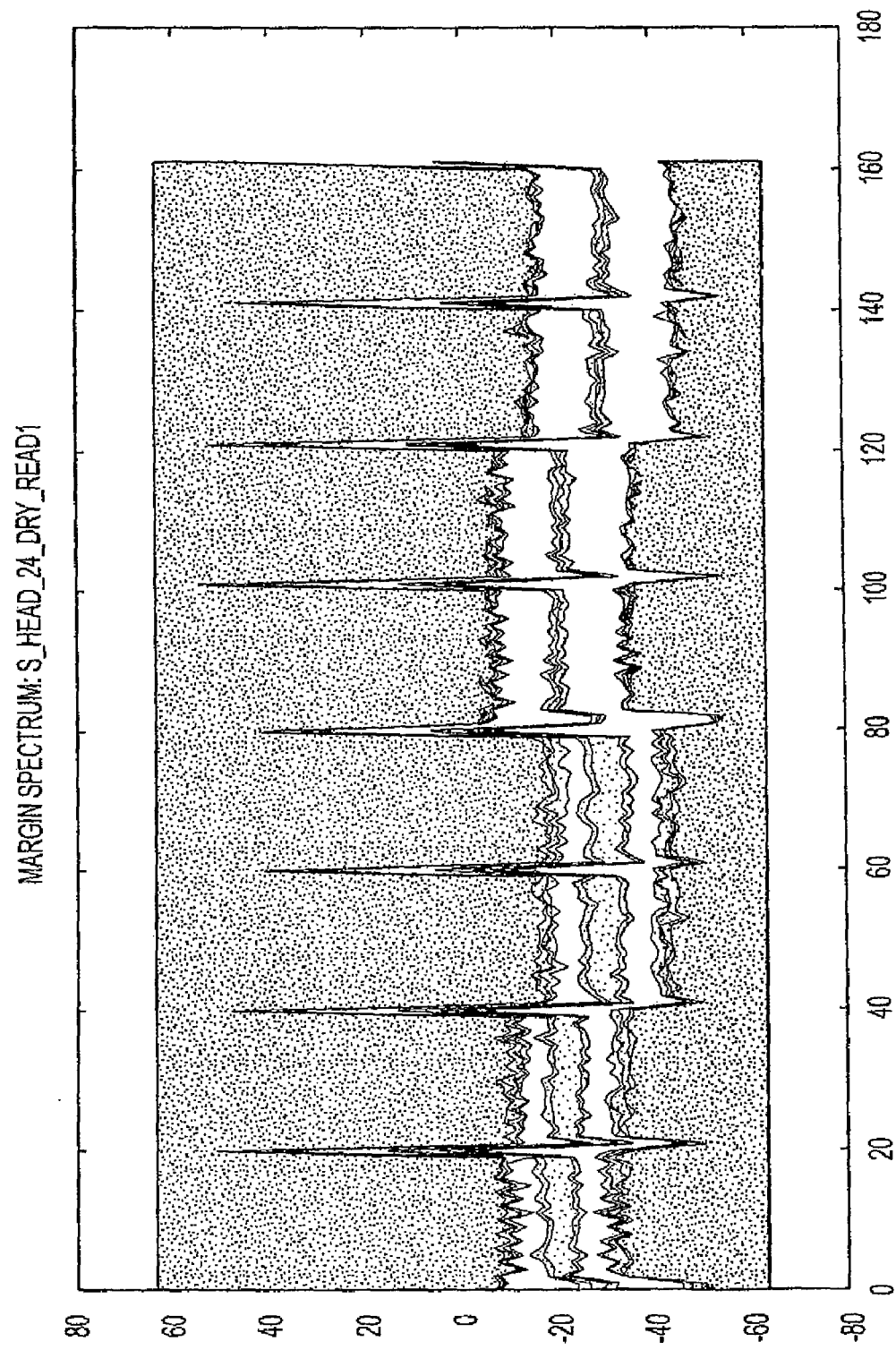
FIG. 9 is a chart illustrating the results of reading data from a tape in an environment having 10% relative humidity that was written in an environment having 80% relative humidity.

FIG. 9 illustrates an analysis of data tracks written at 85% relative humidity being read at 10% relative humidity. The x-axis and y-axis have the same units as the graph in FIG. 8. In FIG. 9, the tape is shrunk for example because the tape endured an environmental change from 80% to 10% relative humidity. Due to this shrinkage, the position of the written tracks shifted, and the width of the physical and virtual tracks also shrunk. For example, mechanical position errors and tape dimensional stability caused the position of the virtual track corresponding to track 1 to shift such that it is no longer centered at 0 microns, and is only readable between the range of approximately −1.0 microns to −5.0 microns. This range of approximately 4 microns is significantly less than the ability of traditional tape drives to recover data. Accordingly, conventional tape drives would not be able to reliably read the tracks in this dry environment.

The embodiment described above illustrates accurate detection of errors due to dimensional stability of the tape. Accordingly, the embodiment is able to account for dimensional stability errors in the tape and accurately adjust head positions to ensure that the width of written data tracks is at least a minimum predefined width to guarantee that the read elements can read the track. Since the minimum track width is predefined, the minimum width at which tracks are written can be adjusted to ensure that the tracks can also be read by other tape drives irregardless of the environmental conditions in which they were written. Furthermore, in the case where the tracks are shifted down as in FIG. 9, with respect to FIG. 8, the embodiment is able to accurately detect this error and adjust the write elements such that the narrowest previously written track remains wide enough to be read. Even in extreme conditions, when written customer data becomes so warped that it is no longer readable, the customer data is still preserved on the tape such that the data can be read under different conditions.

Offset Readers

Conventional tape heads such as those used in LTO or SDLT use heads with two read elements for forward and reverse operation of the tape drive. For example, the two read elements provide forward and reverse read after write verification. During the read operation, the function of the backward read element is similar to that of the forward read element, and the drives normally can use either the forward or backward read element to read in either a forward or a backward direction of the tape. According to an exemplary embodiment of the invention, to enhance the reader pitch range, the two read elements of each head may be positioned such that it is possible to read data under various environmental conditions as the tape dimension varies due to the environmental conditions.

When the tracks on a tape shrink or expand due to changes in relative humidity or for other reasons, the read elements may not be able to align to the tracks perfectly, even though the VTS preserves the track width, since the pitch between the read elements is fixed. Although the data is still recoverable by expanding or shrinking the data tracks to the size when the tracks to be read were written, adjusting the tape in this manner is cumbersome because, for example, the relative humidity may need to be adjusted differently for each track. In an embodiment of the invention, the backward and forward read elements are constructed with slightly different pitch to be able to read the tracks on the tape.

Figure 10:
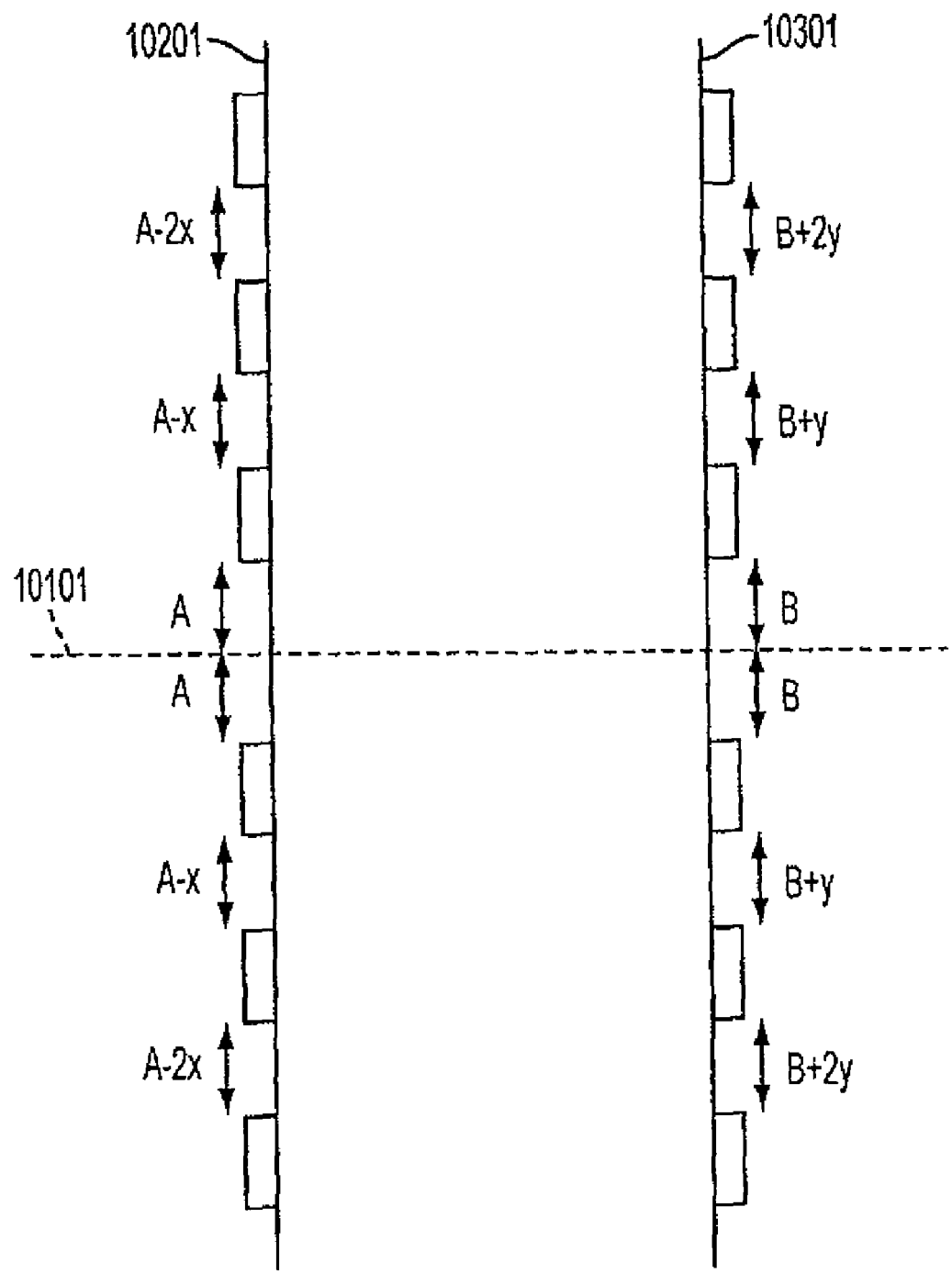
FIG. 10 is a diagram illustrating positioning of the read elements, for example, during manufacturing according to an exemplary embodiment of the present invention.

As shown in FIG. 10, for example, the pitch of the forward read elements 10201 with respect to each other is constructed to decrease as the distance from the center of all the heads of the tape drive 10101 increases. Each successive forward read element from the center 10101 is constructed to be closer to the previous forward read element. Alternatively, the pitch of the backward read elements 10301 with respect to each other is constructed to increase as the distance from the center 10101 increases. Each successive backward read element from the center of the tape 10101 is constructed to be further away from the previous backward read element. The pitch may decrease/increase as the distance from the center of the track increases for the forward/backward read elements, respectively. Utilizing this construction for the forward and backward read elements, if for example, a forward read element cannot read a track because the track expanded to be above the forward read element, the backward read element of the same head may be able to read the track. In FIG. 10, 'A' indicates a nominal pitch for the forward read elements and 'B' indicates a nominal pitch for the backward read elements, which for example can be 100 microns. An offset x in the pitch of the forward read elements, and an offset y in the pitch of the backward read elements can, for example, have a value of 0.2 microns. These values are provided by way of an example only and not by way of a limitation.

It should be recognized by those of ordinary skill in the art that exemplary heads with read and write elements are provided by way of an example only and not by way of a limitation. Various other configurations to read and write data tracks are possible. For example, the determining of the positioning of the write and read elements may comprise software instructions stored on a computer readable medium.

The above and other features of the invention including various novel method operations and a system of the various modules have been particularly described with reference to the accompanying drawings and pointed out in the claims. It will be understood that the particular process and construction of parts embodying the invention is shown by way of illustration only and not as a limitation of the invention. The principles and features of this invention may be employed in varied and numerous embodiments without departing from the spirit and scope of the invention as defined by the appended claims and their equivalents. For example, the exemplary embodiments provided assume writing a current track above a previously written track. However, the spirit of this invention can easily apply to situations where a current track is written below a previously written track. Similarly, the exemplary processes illustrated in FIGS. 3 and 4 can just as easily be practiced by initializing the read elements below a written track and incrementally moving the read elements across the virtual track in an upward direction. Additionally, particular examples are described with reference to various disadvantages in the conventional techniques. This discussion is not meant, however, to restrict the various examples to methods and/or systems that actually address or solve the disadvantages of the conventional techniques.

What is claimed is:

1. A linear tape storage medium, comprising:
a linear tape media including
a first physical band comprising two or more data tracks;
a second physical band comprising two or more data tracks,
wherein, for the first and second physical bands, successively written tracks of the two or more data tracks partially overwrite a corresponding adjacent track of the two or more data tracks to define respective widths for the two or more data tracks;
wherein the width of a narrowest data track of either the first or second physical bands is greater than or equal to a virtual read element width over a predefined range of environmental conditions; and
wherein a pitch of at least a first and a second data track of the two or more data tracks of the first physical band varies from a pitch of the two or more data tracks of the second physical band concurrently written with the first and second data tracks of the first physical band, respectively.

2. A linear tape storage medium, comprising:
a linear tape media including
a first physical band comprising two or more data tracks;
a second physical band comprising two or more data tracks,
wherein, for the first and second physical bands, successively written tracks of the two or more data tracks partially overwrite a corresponding adjacent track of the two or more data tracks to define respective widths for the two or more data tracks;
wherein the width of a narrowest data track of either the first or second physical bands is greater than or equal to a virtual read element width over a predefined range of environmental conditions; and
wherein the virtual read element width defines a minimum readable width of a virtual track, and wherein the virtual track defines a respective region in which each of a plurality of read elements is able to read a respective track concurrently with other read elements of the plurality of read elements.

3. The linear tape storage medium of claim 2 wherein the virtual track changes as a result of environmental conditions.

4. A linear tape storage medium, comprising:
  a linear tape media including
    a first physical band comprising two or more data tracks;
    a second physical band comprising two or more data tracks,
  wherein successively written tracks of the two or more data tracks partially overwrite a corresponding adjacent track of the two or more data tracks to define respective widths for the two or more data tracks;
  wherein a pitch of the two or more data tracks of the first physical band varies from a pitch of the two or more data tracks of the second physical band; and
  wherein a pitch of at least a first and a second data track of the two or more data tracks of the first physical band varies from a pitch of the two or more data tracks of the second physical band concurrently written with the first and second data tracks of the first physical band, respectively.

5. A linear tape storage medium, comprising:
  a linear tape media including
    a first physical band comprising two or more data tracks;
    a second physical band comprising two or more data tracks,
  wherein successively written tracks of the two or more data tracks partially overwrite a corresponding adjacent track of the two or more data tracks to define respective widths for the two or more data tracks;
  wherein a pitch of the two or more data tracks of the first physical band varies from a pitch of the two or more data tracks of the second physical band;
  wherein the width of a narrowest data track of either the first or second physical bands is greater than or equal to a virtual read element width over a predefined range of environmental conditions; and
  wherein the virtual read element width defines a minimum readable width of a virtual track, and wherein the virtual track defines a respective region in which each of a plurality of read elements is able to read a respective track concurrently with other read elements of the plurality of read elements.

6. The linear tape storage medium of claim 5 wherein the virtual track changes as a result of environmental conditions.

* * * * *